United States Patent
Hwang et al.

(10) Patent No.: US 11,236,453 B2
(45) Date of Patent: Feb. 1, 2022

(54) ARTIFICIAL INTELLIGENCE WASHING MACHINE PROVIDING AUTOMATIC WASHING COURSE BASED ON VISION

(71) Applicant: LG Electronics Inc., Seoul (KR)

(72) Inventors: Sungmok Hwang, Seoul (KR); Sangyun Kim, Seoul (KR); Yunsik Park, Seoul (KR); Hyunsung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 328 days.

(21) Appl. No.: 16/553,742

(22) Filed: Aug. 28, 2019

(65) Prior Publication Data

US 2019/0382941 A1    Dec. 19, 2019

(30) Foreign Application Priority Data

Sep. 5, 2018  (KR) .................. 10-2018-0106195

(51) Int. Cl.

| | |
|---|---|
| *D06F 33/36* | (2020.01) |
| *G06N 20/00* | (2019.01) |
| *D06F 34/18* | (2020.01) |
| *D06F 103/02* | (2020.01) |
| *D06F 103/40* | (2020.01) |
| *D06F 105/10* | (2020.01) |
| *D06F 105/12* | (2020.01) |

(Continued)

(52) U.S. Cl.
CPC ............ *D06F 33/36* (2020.02); *G06N 20/00* (2019.01); *D06F 33/38* (2020.02); *D06F 33/40* (2020.02); *D06F 34/18* (2020.02); *D06F 2101/20* (2020.02); *D06F 2103/02* (2020.02); *D06F 2103/40* (2020.02); *D06F 2105/10* (2020.02); *D06F 2105/12* (2020.02); *D06F 2105/20* (2020.02); *D06F 2105/58* (2020.02); *D06F 2105/60* (2020.02)

(58) Field of Classification Search
CPC ....................................................... D06F 33/36
See application file for complete search history.

(56) References Cited

FOREIGN PATENT DOCUMENTS

| | | |
|---|---|---|
| CN | 107574625 | 1/2018 |
| EP | 2573247 | 3/2013 |

(Continued)

OTHER PUBLICATIONS

Extended European Search Report in European Application No. 19193294.6, dated Oct. 29, 2019, 8 pages.

(Continued)

*Primary Examiner* — Jason Y Ko
(74) *Attorney, Agent, or Firm* — Fish & Richardson P.C.

(57) ABSTRACT

The present invention relates to home appliances treating the laundry or object received therein using artificial intelligence. Specifically, the home appliance may include an artificial intelligence-based laundry washing machine that recognizes a load based on vision and automatically provides a specific course. The home appliance include a processor configured to: obtain a learning result from a learning operation using image information previously acquired using the camera and treatment information previously acquired from user interface; and process image information currently acquired using the camera with respect to the learning result, thereby to generate and set current treatment information; and control the home appliance to treat the object based on the set current treatment information.

23 Claims, 11 Drawing Sheets

(51) Int. Cl.
*D06F 105/20* (2020.01)
*D06F 105/58* (2020.01)
*D06F 105/60* (2020.01)
*D06F 101/20* (2020.01)
*D06F 33/38* (2020.01)
*D06F 33/40* (2020.01)

(56) References Cited

FOREIGN PATENT DOCUMENTS

| | | |
|---|---|---|
| KR | 1020140073197 | 6/2014 |
| KR | 1020180016599 | 2/2018 |
| WO | WO2019109785 | 6/2019 |

OTHER PUBLICATIONS

European Office Action in European Application No. 19193294.6, dated Jul. 7, 2020, 5 pages.

DB

Query

Support

ARTIFICIAL INTELLIGENCE WASHING MACHINE PROVIDING AUTOMATIC WASHING COURSE BASED ON VISION

CROSS-REFERENCE TO RELATED APPLICATION

This application claims a benefit under 35 U.S.C. § 119(a) of Korean Patent Application No. 10-2018-0106195 filed on Sep. 5, 2018, on the Korean Intellectual Property Office, the entire disclosure of which is incorporated herein by reference for all purposes.

BACKGROUND

1. Field

The present disclosure relates to home appliances treating the laundry or object received therein using artificial intelligence. Specifically, the home appliance may include an artificial intelligence-based laundry washing machine that recognizes a load based on vision and automatically provides a specific course.

2. Description of Related Art

There are many kinds of home appliances that receives objects and treat the objects. That is, a variety of home appliances may be provided depending on the types of the objects and how to treat the objects.

A home appliance that receives laundry and treats laundry may include a laundry washing machine, a laundry drying machine, a styler (a laundry treatment apparatus or a laundry managing apparatus). In this connection, the laundry may include various laundry such as bedclothes, textile dolls, and shoes as well as clothes worn by the user.

Laundry treatment may include various treatments such as washing, drying, refreshing, sterilization. One laundry treatment apparatus may be provided for a specific treatment process of various treatment procedures or may be provided to perform a plurality of treatment procedures.

In the laundry washing machine, a washing course may be performed in which washing and rinsing are performed using washing water and then spinning is performed.

In the laundry drying machine, a drying or refreshing course may be provided in which drying or refreshing is performed using hot air.

These laundry treatment apparatus provide various treatment courses depending on the type of laundry. At least one auxiliary information may be included in each treatment course.

These home appliances may be extended to dishware washers that treat dishware or to cooking appliances that cook food ingredients. In such dishware washer or cooking appliances, the objects may be treated via various treatment courses depending on the user's intention or according to the type of the objects.

In a conventional home appliance, when a user inputs an object into an object reception area, and then inputs object treatment information, the appliance treats objects according to input treatment information.

In the laundry washing machines, the laundry to be washed is put into a laundry accommodating portion such as a drum. After a user selects a specific washing course from a variety of washing courses, washing is usually performed according to the washing course as selected.

For example, when a user intends washing bedding such as a blanket, the user may choose "blanket course". When a user intends washing laundry made of wool, the user may choose "wool course".

It is common to have a plurality of treatment information for laundry provided to the home appliance. For example, depending on the type of home appliances, treatment information is provided in specific course forms such as washing course, drying course, refreshing course, cleaning course, cooking course. It is common that each of the washing course, drying course, refreshing course, cleaning course, cooking course may have a plurality of treatment information. The laundry washing machine may provide multiple treatment information such as a standard course, a baby clothes course, a blanket course, and a functional clothes course.

Each treatment information or course information is tailored to the optimal treatment according to the type of the object to be treated. In other words, to prevent damage of the object to be treated while achieving the optimal treatment result, a series of object treatment procedures and treatment conditions may be pre-established.

For the laundry washing machines, although the variety of treatment information are provided depending on the type of laundry being treated, the user only uses the treatment information selected by default. Therefore, there is a problem that the laundry washing machine cannot be used efficiently by the user.

Further, whenever a user wishes to wash the laundry using a laundry washing machine, the treatment information must be manually selected and input by the user. This may require much effort.

Recently, artificial intelligence has become a hot topic in the home appliances. However, currently, in the home appliances, the artificial intelligence is only about providing users with specific information based on accumulated data on the home appliances. Strictly speaking, this operation may not be true artificial intelligence based operation but merely data processing.

Therefore, it is necessary to provide a home appliance having artificial intelligence which not only performs a simple cumulative data treatment but also evolves via learning. Thus, a home appliance may be provided which may automatically set optimal treatment information without the user having to enter the treatment information.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

One embodiment of the present disclosure is to provide a home appliance and control method thereof that may set optimal treatment information via learning without requiring the user to enter treatment information manually.

One embodiment of the present disclosure is to provide a home appliance and control method thereof, by which a mode in which the user manually entering treatment information and a mode in which the home appliance automatically sets treatment information are selectively and easily performed.

One embodiment of the present disclosure is to provide a home appliance and control method thereof that may enhance user satisfaction by informing the user that the appliance performs learning and is evolving.

One embodiment of the present disclosure is to provide a home appliance and control method in which the user permits the appliance to perform learning or injects information to the appliance or manipulates the learning thereof for correct learning of the appliance.

One embodiment of the present disclosure is to provide a home appliance and control method in which the learning is performed only using information acquired from a specific home appliance used by a user to enable the user-customized learning.

One embodiment of the present disclosure is to provide a home appliance and control method in which the information needed for learning is minimized to reduce time taken for the learning, and to simplify the learning process.

One embodiment of the present disclosure is to provide a home appliance and control method in which a correction process may be performed to change sub information or auxiliary information of the treatment information during or after the object treatment based on the set treatment information.

One embodiment of the present disclosure is to provide a home appliance and control method in which treatment information about an object that affects the object treatment but are not general is automatically set.

One embodiment of the present disclosure is to provide a home appliance and control method in which the treatment information may be set via learning using the image information generated by automatically capturing the object accommodated in the object receiving portion.

One embodiment of the present disclosure is to provide a home appliance and control method in which the appliance rotates or shock an object contained in the object containing portion and thus acquire images of the object at various angles and checks the type/status of the object more accurately.

One embodiment of the present disclosure is to provide a home appliance and control method in which in the condition that various laundry are mixed, a laundry having the highest priority in terms of washing quality is discriminated and then a washing course corresponding to the discrimination is provided such that the laundry damage may be prevented.

One embodiment of the present disclosure is to provide a home appliance and control method in which the learning is performed automatically and the user may selectively use the learning result.

One embodiment of the present disclosure is to provide a home appliance and control method in which the home appliance may learn user-specific usage pattern and thus provide the course setting customized to the user.

One embodiment of the present disclosure is to provide a home appliance and control method in which the user may intuitively and easily determine whether the home appliance performs learning and/or whether the learning is possible In a first aspect of the present disclosure, there is provided a home appliance comprising: a cabinet; an object containing portion disposed in the cabinet for receiving an object to be treated; a door provided on the cabinet for opening and closing the object containing portion; a camera disposed on the cabinet or door to generate image information of the object contained in the object containing portion; a user interface configured to receive treatment information of the object from a user; and a main processor configured to: obtain a learning result from a learning operation using image information previously acquired using the camera and treatment information previously acquired from user interface; and process image information currently acquired using the camera with respect to the learning result, thereby to generate and set current treatment information; and control the home appliance to treat the object based on the set current treatment information.

In one implementation, the current treatment information may be set by the main processor. Alternatively, the main processor may receive the current treatment information that may be set using a server.

In one implementation, the set treatment information may be informed to the user using the user interface. The user interface may inform the user of treatment currently performed based on the set treatment information. The user interface may inform the user of remaining time information or currently executed treatment (washing, rinsing, or spinning treatment).

In one implementation, the image information is an input parameter for the learning operation, and the treatment information is an output parameter from the learning operation.

In one implementation, the learning operation is performed using a learning processor embedded in the home appliance or a learning processor in a server communicating with the home appliance. However, it is desirable that the database of the learning results be provided in the home appliance itself. Thus, a specialized database customized to the user himself may be configured. Further, time consuming due to database creation, augmentation, and modification can be minimized.

In one implementation, the user interface includes at least one of a speaker for outputting voice, a microphone for receiving voice, a display, or a button or touch panel for receiving pressurization or physical contact from a user.

In one implementation, the learning operation includes determining presence or absence of a learning result corresponding to the currently acquired image information.

In one implementation, upon determination that the corresponding learning result is present, treatment information corresponding to the learning result is output and set.

In one implementation, after setting the treatment information, the set treatment information is approved or disapproved by the user using the user interface.

In one implementation, when the user disapproves the set treatment information, a forced learning operation is performed to match treatment information allowed by the user with the currently acquired image information. In other words, it is preferable that the treatment information set by the user is given priority over the treatment information set by the learning.

In one implementation, upon determination that the corresponding learning result is absent, a forced learning operation is performed to match treatment information allowed by the user with the currently acquired image information.

In one implementation, the forced learning step may be configured such that when new treatment information is recommended, the new treatment information may be approved by the user, or the user directly match the treatment information with the current image.

In one implementation, the learning operation is configured to increase a number of combinations of a plurality of mutually-distinguished image information and treatment information corresponding to the plurality of mutually-distinguished image information respectively. Thus, the user may notice based on the increase that the home appliance evolves. In other words, the user may perceive that the machine gets smarter.

In one implementation, the user interface includes a start input interface to allow the user to approve the set treatment information such that the appliance starts the object treatment based on the set treatment information. The start input interface may be implemented as a physical button or using user speech recognition via a microphone.

In one implementation, the treatment information includes a plurality of course information corresponding to treatment courses performed by the home appliance. For laundry washing machines, the course information may include washing courses. For the object drying machines, the course information may include drying courses. For the refreshers, the course information may include styling courses or clothes courses. For the dishware washer, the course information may include a plurality of cleaning courses. For the cooking devices, the course information may include a plurality of cooking courses.

In one implementation, the treatment information include auxiliary information in the course information.

In one implementation, the auxiliary information includes at least one of a washing-water temperature, washing-water level, spinning RMP, washing strength, washing time duration, rinsing frequency, or steam presence or absence.

In one implementation, the auxiliary information includes at least one of a drying or refreshing time duration, hot air temperature, temperature inside the object containing portion, dryness level, humidity, or steam presence or absence.

In one implementation, the learning operation includes a correction process that changes the auxiliary information during or after treatment of the object based on the set current treatment information.

In one example, blanket course was learned. During the treatment of the cotton doll in the blanket course, the spinning related problem may occur. Thus, a correction process may be performed to solve the problem. In this case, it is desirable to perform the blanket course, but to correct the auxiliary information to lower the RMP during the spinning.

When the padding as an uncommon object or laundry is subjected to the treatment, a correction process may be performed. The padding may be an object with a high volume but very low absorption of washing-water. When the padding is subjected to the treatment, and when a standard course is learned and the amount of the washing-water is larger, a problem may occur. Thus, this correction process may be performed. In this case, it is desirable to carry out the standard course but to correct the auxiliary information to lower the washing-water level.

In one implementation, during the treatment of the object based on the set current treatment information, image information of the object contained in the object containing portion is additionally generated.

In one example, when the washing is terminated or rinsing has been terminated, the image information of the object may be generated additionally. When the washing is terminated, the image information of the object may be used to increase or decrease the number of rinsing or to increase the amount of rinsing washing-water. When rinsing is terminated, the machine may use the image information from the object to determine whether the laundry is entangled with each other. This image may be used to increase or decrease the spinning RPM or to remove the entanglement. That is, a final spinning may be performed after the entanglement removal is performed using the rotation of the drum.

Using this additional image generation, the learning may be performed and the course setting may be performed automatically. Therefore, this may be more effective because the treatment information may be corrected by using the image during the treatment, that is, before the termination of the treatment, rather than using fixed treatment information including only the initial image.

In one implementation, the current treatment information may be set automatically. That is, when the user does not currently enter the treatment information using the user interface, the current treatment information may be set automatically.

The automatic setting is preferably distinguished from the default setting. The default setting refers to the treatment information setting that is performed basically in the power application and to which the learning result is not reflected at all. On the other hand, the automatic setting refers to information setting that reflects the learning result. Therefore, it is preferable to use the user interface to recognize that the current setting is an automatic setting by learning, using a character notification, a voice notification, or fixed turn on of the LED after the LED is turned on variably.

In one implementation, the treatment information includes a plurality of course information corresponding to treatment courses performed by the home appliance.

In one implementation, when a learning result corresponding to at least one course information among the plurality of course information, the current treatment information is set automatically. If there is no learning result, a forced or injected learning step may be performed.

In one implementation, when a learning result corresponding to each of the plurality of course information, the current treatment information is set automatically. If there is no learning result, a forced or injected learning step may be performed.

In one implementation, the user interface includes a course selection interface to allow the user to select one of the plurality of course information, wherein the plurality of course information includes a learning-based course in which the current treatment information is automatically set based on the learning result.

In one implementation, the user interface includes a learning-based course selection interface to allow the user to select the learning-based course, wherein the learning-based course selection interface is different from the course selection interface.

In one implementation, when the user selected the learning-based course immediately before using the course selection interface or the learning-based course selection interface, the learning-based course is currently selected by default.

In one implementation, when a course other than the learning-based course among the plurality of course information is selected, the processor is configured to perform learning using the currently acquired image information for the selected course. In this case, the learning may be performed but the learning result is not reflected.

Therefore, even when the learning result is not reflected, continuous evolving of the home appliance may be promoted.

In one implementation, the appliance further include a door sensor to detect whether the door is closed, wherein the camera generates the image information after power is applied to the home appliance and a closed state of the door is detected by the door sensor. Further, the camera may generate additional image information before completing the treatment or during treatment of the object in the closed door state. Likewise, the learning may be performed using the additional images which may be used to correct previously set treatment information.

According to a second aspect of the present disclosure, a control method of the home appliance may be provided, the method including a step to create and acquire image information using the camera; a step to acquire object treatment information set by user; a step to perform learning using previously acquired image information and object treatment information; and a step of treating the object based on the current treatment information set using the learned result and the currently acquired image information.

The control method may include a correction step as described above. The method may include additional image generation steps.

The features in the above-described embodiments may be in combination with features in other embodiments, unless they are exclusive or contradictory to each other.

The effects of the present disclosure include, but are not limited to followings.

One embodiment of the present disclosure may provide a home appliance and control method thereof that may set optimal treatment information via learning without requiring the user to enter treatment information manually.

One embodiment of the present disclosure may provide a home appliance and control method thereof, by which a mode in which the user manually entering treatment information and a mode in which the home appliance automatically sets treatment information are selectively and easily performed.

One embodiment of the present disclosure may provide a home appliance and control method thereof that may enhance user satisfaction by informing the user that the appliance performs learning and is evolving.

One embodiment of the present disclosure may provide a home appliance and control method in which the user permits the appliance to perform learning or injects information to the appliance or manipulates the learning thereof for correct learning of the appliance.

One embodiment of the present disclosure may provide a home appliance and control method in which the learning is performed only using information acquired from a specific home appliance used by a user to enable the user-customized learning.

One embodiment of the present disclosure may provide a home appliance and control method in which the information needed for learning is minimized to reduce time taken for the learning, and to simplify the learning process.

One embodiment of the present disclosure may provide a home appliance and control method in which a correction process may be performed to change sub information or auxiliary information of the treatment information during or after the object treatment based on the set treatment information.

One embodiment of the present disclosure may provide a home appliance and control method in which treatment information about an object that affects the object treatment but are not general is automatically set.

One embodiment of the present disclosure may provide a home appliance and control method in which the treatment information may be set via learning using the image information generated by automatically capturing the object accommodated in the object receiving portion.

One embodiment of the present disclosure may provide a home appliance and control method in which the appliance rotates or shock an object contained in the object containing portion and thus acquire images of the object at various angles and checks the type/status of the object more accurately.

One embodiment of the present disclosure may provide a home appliance and control method in which in the condition that various laundry are mixed, a laundry having the highest priority in terms of washing quality is discriminated and then a washing course corresponding to the discrimination is provided such that the laundry damage may be prevented.

One embodiment of the present disclosure may provide a home appliance and control method in which the learning is performed automatically and the user may selectively use the learning result.

One embodiment of the present disclosure may provide a home appliance and control method in which the home appliance may learn user-specific usage pattern and thus provide the course setting customized to the user.

One embodiment of the present disclosure may provide a home appliance and control method in which the user may intuitively and easily determine whether the home appliance performs learning and/or whether the learning is possible

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTIONS

Figure 1:
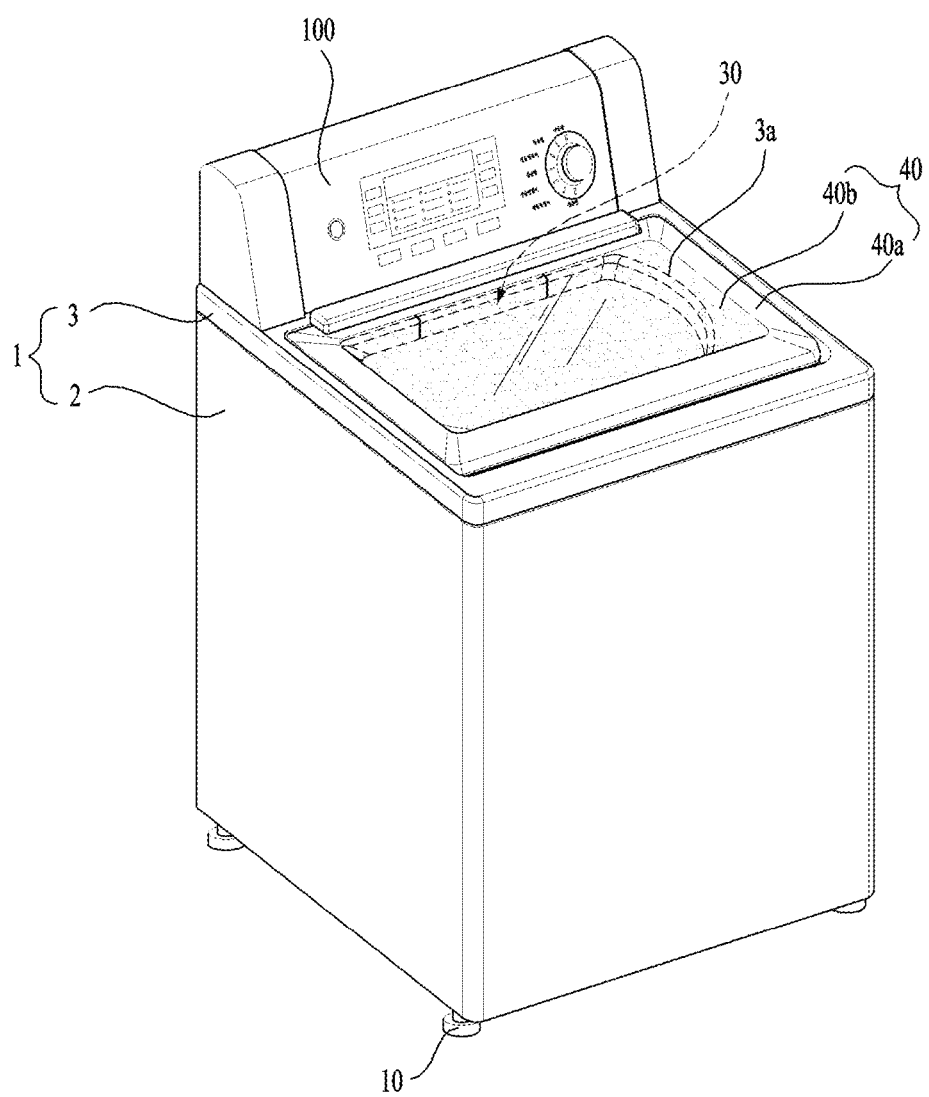
FIG. 1 is a perspective view of one example of a home appliance according to one embodiment of the present disclosure.

For simplicity and clarity of illustration, elements in the figures are not necessarily drawn to scale. The same reference numbers in different figures denote the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a home appliance and control method thereof according to one embodiment of the present disclosure will be described in detail with reference to the accompanying drawings.

First, one example of a laundry washing machine, which may be applied to the embodiment of the present disclosure, will be described in detail with reference to FIGS. 1 to 2. The illustrated washing machine may be called a vertical axis type laundry washing machine or a top loading laundry washing machine.

The laundry washing machine may include a casing 1. The casing 1 may include a side cabinet 2 having open top and bottom faces and forms a lateral face of the laundry washing machine, a top cover 3 installed to cover the open top face of the side cabinet 2, and a base 5 installed on the open bottom face of the cabinet 2.

The cabinet 2 may include an outer tub 4 where washing-water is accommodated, an inner tub 6 disposed inside the outer tub 4 and receiving laundry, a driving mechanism 8 including a motor 8*b* for driving the inner tub 6 and a shaft 8*a* for transmitting the driving force of the motor 8 to the inner tub 6, water supply means 20 including a water supply valve 12 for supplying water to the inside of the outer tub 4, and a drainage assembly 20 including a drainage pump 24 to drain the water in the outer tub 4 after the washing or spinning is completed.

In the laundry washing machines, the object may be called laundry. The treatment of the object may be called washing. The inner tub 6 could be called an object containing portion containing the laundry as the object. The object, the object treatments and the object containing portions may vary between the types of the home appliances as described above.

The water supply means 30 is included in the top cover 3 and further includes a detergent box 32 in which the detergent is temporarily stored. The detergent box 32 may be contained within a detergent box housing 31. The detergent box 32 may be removably attached to the detergent box housing 31 in the form of a drawer.

The water supplying means 30 may include a water supply valve 12 and a water supply hose 13. The water supply valve 12 may be connected to the external hose 11. Washing water may be supplied from the external water source through the external hose 11 to the water supply hose 13.

The water supply hose 13 may be connected to an external water source which may supply hot water and cold water. That is, a hot water hose and a cold water hose may be separately provided. In this case, the water supply valve 12 may include separately a hot water supply valve and a cold water supply valve.

Accordingly, when the water supply valve 12 is opened, hot water or cold water may be supplied individually or simultaneously to the detergent box 32. Then, the supplied washing-water together with the detergent may be supplied to the inner tub 6.

The detergent box 32 may be positioned to correspond to the open top of the inner tub 6. Then, washing-water may be supplied to fall down toward the bottom surface of the inner tub 6. Thus, as the washing-water is supplied, the laundry contained in the inner tub 6 gets wet with washing-water as dropped to some extent. Further, the washing-water containing detergent therein will soak the laundry.

The top cover 3 has a laundry inlet/outlet hole 3*a* so that laundry may be put in or taken out therethrough. The top cover 3 has a door 40 for opening and closing the laundry inlet/outlet hole 3*a*. The door 40 may be at least partially made of glass so that the interior thereof is visible to the user. That is, the door 40 includes a frame 40*a* and a glass 40*b* fitted to the frame 40*a*.

Further, on one portion of the top cover 3, there is mounted a control panel 100 for receiving the operation mode of the laundry washing machine from the user or for indicating the operating state of the laundry washing machine. That is, the control panel 100 may act as a user interface. The control panel 100 or the user interface may be provided to be separated from the cabinet 1 and the door 40 or may be provided as a part thereof.

The user may enter or select laundry treatment information via the user interface. The user may then recognize the laundry treatment information of the laundry currently being treated through the user interface. Therefore, the user interface may be input means for inputting information by the user and output means for outputting information to the user.

The outer tub 4 is disposed on a top of the inner space of the cabinet 1 such that the outer tub 4 depends on a plurality of suspensions 15. One end of the suspension 15 may be coupled to the top of the inner portion of the cabinet 1, while the other end thereof may be coupled to the lower portion of the outer tub 4.

At the bottom of the inner tub 6, a pulsator 9 is installed to form a rotating water stream of water contained in the outer tub 4. The pulsator 9 is formed integrally with the inner tub 6 so that the inner tub 6 and the pulsator 9 rotate together when the motor 8 rotates. Alternatively, the pulsator 9 is formed separately from the inner tub 6, such that it may rotate separately when the motor 8 rotates. That is, only the pulsator 9 may rotate. Alternatively, the pulsator 9 and the inner tub 6 may rotate at the same time.

On the upper side of the inner tub 6, a balancer 12 is installed to prevent the inner tub 6 from being out of balance due to the positional bias of the laundry. The balancer 12 may act as a liquid balancer filled with a liquid such as salt water.

On the upper side of the outer tub 4, there is provided an outer tub cover 14 for preventing the release of the laundry and the scattering of water.

Figure 2:
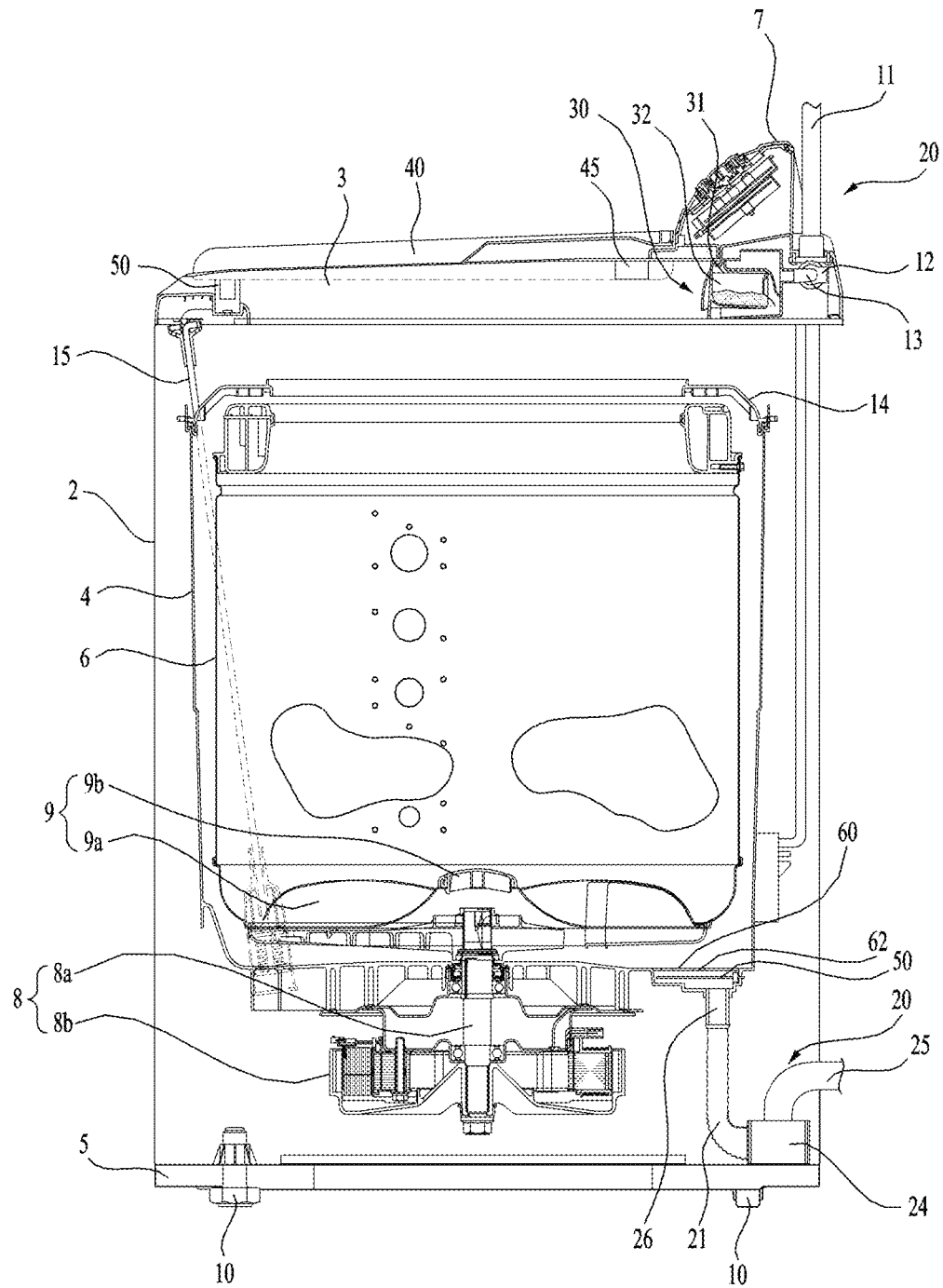
FIG. 2 is a cross-sectional view of the home appliance shown in FIG. 1.

Referring to FIG. 2, the drainage assembly 20 includes a first drainage hose 21 connected to a drainage hole 26 formed in the bottom face of the outer tub 4, a drain pump housing 24 including a drain pump for pumping water, and a second drainage hose 25 connected to the drainage pump housing 24 for draining water as pumped by the drainage pump to the outside of the cabinet 2. A drain motor for driving the drain pump is contained in the drain pump housing 24. The drainage assembly 20 may be disposed between the outer tub 4 and the base 5.

A washing heater 50 for heating the washing-water and a heater cover 60 for covering the top of the heater 50 may be mounted on the bottom of the outer tub 4.

As shown in FIG. 2, a home appliance according to one embodiment of the present disclosure may include a camera 45. The camera may be provided in the cabinet 1 or the door 40 so as to generate image information of the object provided in the object containing portion.

In one example, the camera may be provided to capture image of an object stored in the inner tub 6 to generate image information. The camera 45 may include an image sensor and an illumination device. The lighting device may include an LED. The image sensor may be an RGB camera.

The camera 45 may be provided on the back or bottom face of the door 40. That is, this is because when the door 40 is closed, the back or bottom face of the door 40 may face toward an inner space of the object containing portion. Thus, the camera 45 may generate image information for an object when the door is closed. Such image information may be used in the learning process as described below.

Inside the object containing portion, an environment for object treatment is set, which is different from the external environment. Especially, the temperature or humidity of the environment for object treatment is different from that of the external environment. For the laundry washing machine, washing-water is contained in the object-containing portion. Therefore, it is common that such object treatment is performed in a state in which the door 40 is closed.

To this end, a door sensor 50 may be provided to sense the closed state of the door 40. The door sensor 50 may be provided in the door or a cabinet 1 corresponding to the door. In one example, the top cover 3 may have the door sensor 50. When the door sensor 50 detects that the door is closed, the object treatment is performed.

The door sensor 50 may be provided in this embodiment. However, the door sensor 50 in the present embodiment may be provided not only for sensing the closed state of the door, but also may be associated with the operation of the camera 45.

That is, the generation time of the image information using the camera 45 may associated with the door closing detection time using the door sensor 50. In one example, when the door sensor 50 senses the closed state of the door, the camera 45 may generate image information.

For the operation of the camera 45 and door sensor 50, power must be applied to these components. Home appliances such as refrigerators are always powered. However, in general, the object treatment apparatuses such as a laundry washing machine, a laundry drying machine, a dishware washer, an oven and a styler may not be always powered.

Therefore, a sequential logic between power up, door sensor operation, and camera operation may be required. Such logic will be described later.

Hereinafter, a user interface that may be applied to one embodiment of the present disclosure will be described in detail with reference to FIG. 3.

Figure 3:
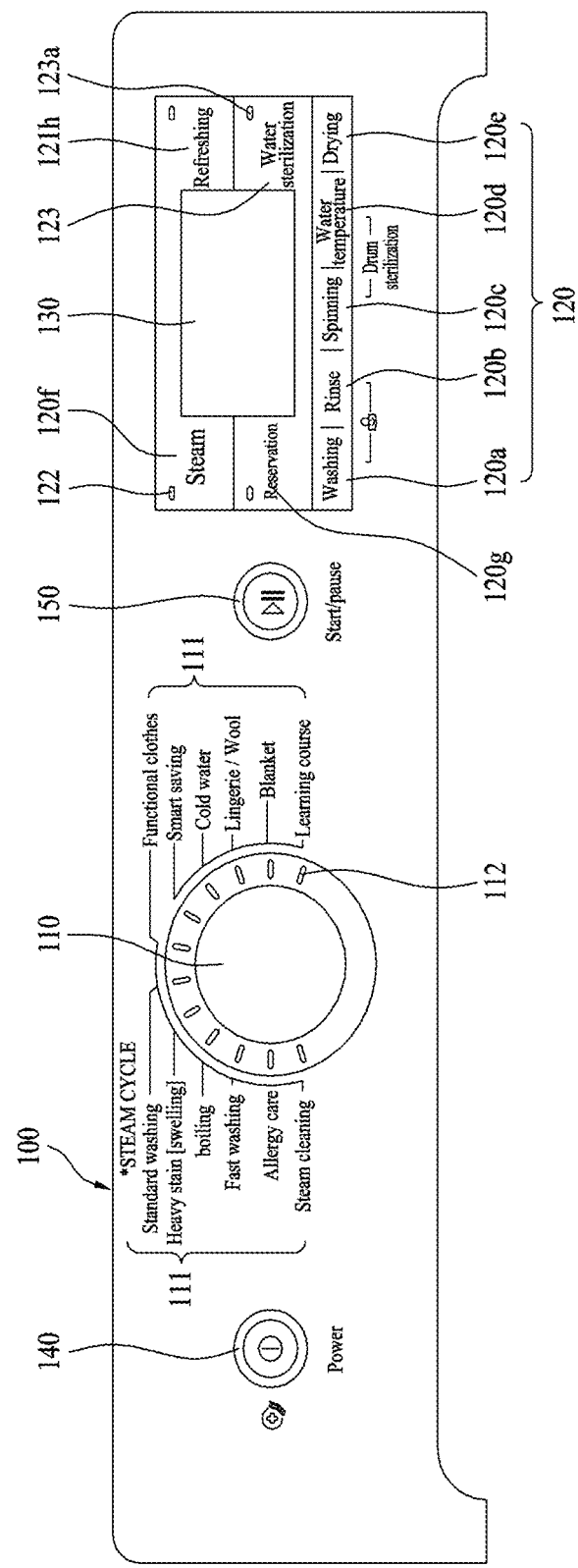
FIG. 3 is a front view of the user interface of the home appliance according to one embodiment of the present disclosure.

FIG. 3 shows one example of the user interface of the laundry washing machine. FIG. 3 shows one example of a user interface of a laundry washing machine that may perform washing functions as well as drying functions.

For the laundry washing machine, the object treatment information may include course information. Such course information means an algorithm preconfigured for sequentially executing a series of processes for laundry treatment, for example, washing, rinsing and spinning processes. For each course, the control parameters for the corresponding processes may be different from each other.

Therefore, a plurality of course information may be defined. The plurality of course information may be defined according to the kind of the object or the special function. Further, each course information has sub information or auxiliary information. Therefore, the object treatment information may include the auxiliary information as well as course information.

For the laundry washing machine, the auxiliary information may include at least one of washing-water temperature, washing-water level, spinning RMP, washing strength, washing time, rinsing times, and steam absence or presence.

For the laundry drying machines or refreshers, the auxiliary information may include at least one of drying or refreshing time, internal temperature of the hot air or the object containing portion, dryness, humidity and steam presence or absence.

For the cooking appliances, the auxiliary information may include at least one of cooking time, cooking temperature, and steam presence or absence.

For the dishware washer, the auxiliary information may include at least one of cleaning time, number of times of rinsing, cleaning water temperature, cleaning water jetting position, cleaning water jetting intensity, drying presence or absence, drying time, and steam presence or absence.

The main function of the laundry washing machine may be washing of the laundry. Accordingly, in the laundry washing machine, a course selection interface 110 or a main function selection interface for selecting a washing course is provided. The user chooses a course using the course selection interface 110. In one example, the course selection interface 110 may be embodied in the form of a rotary knob. The control panel 100 may have the course display interface 111 to facilitate the course selection by the user. the user may select the desired washing course by manipulating the course selection interface 110 while viewing the course display interface.

FIG. 3 shows a course display interface 111 having various washing courses displayed thereon around the rotary knob 110. The user may select a corresponding washing course by rotating the rotary knob 110. That is, the user may select course information using the course selection interface such as rotary knob 110. The course display interface 112 for displaying the selected washing course may be provided. This allows the user to easily identify the selected washing course. The course display interface 112 may be implemented using a flashing LED or the like.

An option selection interface 120 may be provided which may select an option function as added or changed in performing the main function. That is, the option selection interface 120 may be configured to select the auxiliary or sub information about the course information. The option selection interface 120 may be variously configured. In FIG. 3, for example, the option selection interface 120 which may select the option associated with washing 120a, rinsing 120b, spinning 120c, water temperature 120d, drying 120e, steam 120f, reservation 120g, and refreshing 120h is shown. An option display interface 122 indicating that a corresponding option has been selected may be provided and may be implemented using LEDs.

The control panel 100 may include a status display interface 130 for displaying the status of the laundry washing machine. The status display interface 130 may be used to display the current operating status of the laundry washing machine or the course, option and time information as selected by the user.

For example, when the laundry washing machine is currently performing a rinsing step, the status display interface 130 may indicate "rinsing phase". When the appliance waits for the user to enter a course thereto, the appliance may indicate "input a washing course". The current time may be indicated or a remaining time from the current time to a time when the laundry washing machine has performed all the washing courses to complete the washing course.

In one example, the control panel 100 may include a power input interface 140 for turning on and off the power to the laundry washing machine, and a start/pause selection interface 150 for executing the laundry washing machine or for pausing the laundry washing machine. The start/pause selection interface may be referred to as a start input for convenience of description.

Thus, when the user enters object treatment information using the course selection interface 110 and/or option selection interface 120, the object treatment is performed according to input treatment information. This series of processes may be referred to as a manual setting mode.

One example of the manual setting mode is as follows.

The user opens the door 40 and inserts the object and closes the door 40. After the power is applied to the machine using the power input interface 140, the user may use the course selection interface 110 to select a standard washing course and may select the steam option using the steam option selection interface 120f. The spinning option selection interface 120c is used to select the spinning RMP to be higher than a predetermined value (a default value set in standard washing course). Using the water temperature option selection interface 120d, the user may select 40 degrees Celsius higher than a predetermined value (a value set by default in the standard washing course, in one example, a cold water temperature). The input object treatment information may be displayed on the corresponding display interface 112 or 122 or the display 130.

When inputting the object treatment information is completed, the user manipulates the start input interface 150. The home appliance then automatically treats the object based on the treatment information as entered and then terminates.

The present embodiment may provide a home appliance that may enable the automatic setting mode as well as the manual setting mode as described above. That is, the home appliance may be provided that may automatically set the object treatment information without the user having to enter the object treatment information every time the user desires the object treatment.

In particular, the present embodiment may provide the home appliance evolving while performing the learning. the present embodiment may provide a home appliance that may increase the user's satisfaction by allowing the user to know whether the learning is done and whether the appliance has evolved.

In the present embodiment, the home appliance may be learned using the image information of the object as inserted in the object containing portion by the user and then set the object treatment information using the leaning result. That is, even when the user does not input the treatment information manually, the home appliance can set the treatment information by reflecting the learning result. In this connection, the learning using the image information about the object does not refer to specifically identifying washing information such as a label of the laundry as the object, but refers to using the image of the object itself to identify the type of the object and then learning responses from the user to the identification of the type and then repeating this process.

While the user is using the home appliance in the manual setting mode, the home appliance may continue to learn the responses from the user. In other words, the learning process may be performed using image information obtained using the camera 45 and responses from the user as obtained using the user interface. Details of the learning process will be described later.

A course that is set by reflecting the results of the learning process may be called a learning-based course. A mode in which treatment information is set using the learning-based course may be referred to as a learning-based setting mode. The learning-based setting mode may mean a mode in which, unlike the manual setting mode as described above, the treatment information is automatically set even when the user does not input the treatment information manually.

In one example, after the user has activated a learning-based course selection interface 123, the machine may use the learning-based setting mode by default.

One example of the learning-based setting mode is as follows.

The user opens the door 40 and inserts the object and closes the door 40. After powering the machine using the power input interface 140, the user may activate the learning-based course selection interface 123. When the door 40 is closed and the power is turned on, the camera 45 automatically generates image information about the currently input object.

When the learning-based course selection interface 123 is activated, the current treatment information is set using the current learning process results and the currently acquired image information. That is, the treatment information may be set without the user entering the treatment information.

In this connection, it is desirable to let the user know that the treatment information as set is the treatment information reflecting the learning result. That is, it is desirable that the user recognizes that the treatment information corresponding to the current image is set using the result of the learning based on the image information.

For this purpose, it is desirable to display the process of outputting the learning result for about 1 second to about 2 seconds so that the user can recognize the learning result. In one example, this may be done via the indication using the display 130. Alternatively, the plurality of LEDs may be selectively turned on or off. Alternatively, only the LEDs corresponding to the set treatment information may be turned on. Further, the indication may be done via the voice using the speaker.

The user may approve the set treatment information using the start input interface 150. Alternatively, the user may approve the set treatment information using voice input via a microphone.

When the approval step is completed, the treatment of the object may be performed based on the set treatment information.

In one example, the user may enter new treatment information without approval at the approval stage. In this case, forced learning may be performed using the currently acquired image information and newly entered treatment information. In other words, injected learning or forced learning by the user may be performed. The results of such injected learning or forced learning may be prioritized over the learning result from other learning processes. In other words, the learning results from the forced learning may be prioritized over the learning results acquired using the manual setting mode. When reflecting the priority of the learning result into the home appliance, the user may recognize whether the home appliance has evolved via learning.

When the learning-based setting mode is performed after the learning-based course selection interface 123 is selected immediately before, the learning-based course selection interface 123 may be selected by default. That is, as long as the user does not re-select the learning-based course selection interface 123, the selection of the learning-based course may be maintained. Even when the power is turned off after the object treatment using the learning-based course is finished, the learning-based course selection interface 123 may be selected by default when the power is again turned on.

In one example, in an early time when the home appliance is not used frequently, the number or types of learning results may be small. Therefore, the learning result corresponding to the currently obtained image information may not exist.

Thus, a process of determining the presence or absence of the learning result may be performed in a learning-based setting mode.

When there is a learning result, the corresponding treatment information thereto may be output and may be set. On the other hand, when there is no learning result, the appliance may notify the user of no learning result. When the appliance is to wash a new object that was not previously washed, there will be no corresponding learning results. Thus, in this case, the user may be aware that the home appliance intends to receive new information for learning. Therefore, the user may notice that the home appliance is evolving.

When there is no learning result, not only the appliance may notify the user of no learning result, but also, the appliance may guide the user to enter treatment information or suggest similar treatment information to the user. That is, even when there is no treatment information corresponding to the currently acquired image information, the most similar treatment information may be proposed to the user. In this case, the approval step may be performed as described above. In this connection, the forced learning step may be performed.

The learning-based course selection interface 123 may be provided separately from the course input interface 110. Alternatively, the learning-based course selection interface 123 may be provided as a part of the course input interface 110. In the latter case, the selection of the learning-based course and reflection thereof into the appliance may be as described above.

The learning-based course selection interface 123 may be be present to allow the user to select between and use the manual setting mode and the learning-based setting mode. When the user avoids using the manual setting mode from the beginning of use of the home appliance but prefers the automatic setting mode, this learning-based course selection interface 123 may be omitted.

That is, when a sufficient amount of learning results is prepared or a learning result corresponding to the currently acquired image exists, the learning-based setting mode may be performed. To the contrary, when a sufficient amount of learning results is not provided or there is no learning result corresponding to the currently acquired image, the above-described forced learning may be performed.

In the forced learning, the user must enter treatment information manually. However, in this case, the user may recognize using the user interface that the home appliance is learning and evolving to perform the learning-based setting mode. Therefore, the user may not only perform the object treatment using the home appliance, but also may help the appliance evolve and thus observe that my own home appliance is evolving in accordance with the user's intention and thus have fun with it. This fun may be further enhanced when using the voice. Therefore, the user interface may preferably include a microphone and/or speakers.

Figure 4:
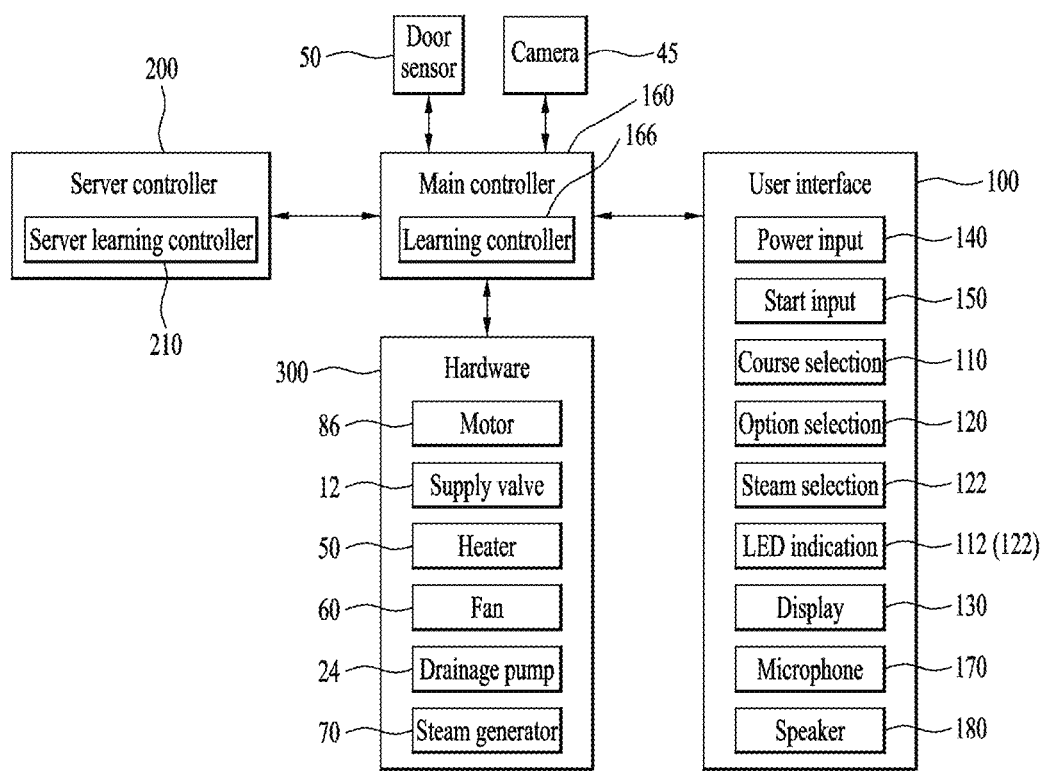
FIG. 4 is a control block diagram of the home appliance according to one embodiment of the present disclosure.

Hereinafter, a control arrangement of the home appliance according to one embodiment of the present disclosure will be described in detail with reference to FIG. 4. The illustrated control arrangement is one example associated with the laundry washing machine. As noted above, the present embodiment of the present disclosure may be equally applicable to the laundry machines as well as other home appliances.

The home appliance may include a main controller or main processor 160 that controls a series of processes of the object treatment. The main controller 160 controls the driving of the hardware 300 to perform the set treatment information. The hardware 300 may be differently configured for the home appliances. The laundry washing machine may include the motor 8b for driving the drum or the inner tub 6 as the object containing portion, a water supply valve 12, a heater 50, and a drain pump 24. When a heater for generating steam is provided separately from the heater 50, the hardware 300 may include a steam generator 70. A separate heater or fan for drying 60 may be included in the hardware.

A learning controller or a learning processor 166 for performing learning and outputting a learning result may be provided. The learning processor 166 may be provided separately from the main processor or may be embedded in the main processor. The learning processor 166 may be programmed with the learning algorithm or learning logic as described below.

The image information as generated using the camera 45 and the treatment information input using the user interface 100 from the user may be transmitted to the main controller 160. The image information and treatment information delivered to the main controller 160 may be forwarded to the learning controller 166. In another example, it is also possible that at least one of the image information and the treatment information may be passed directly to the learning controller 166.

The learning process may be performed by the learning processor 166 to receive the image information as an input and to output the treatment information as output information.

Further, there are a lot of smart home appliances that communicate with servers in recent years. That is, the home appliance is provided with a communication module (not shown) to communicate with the server. Accordingly, the learning processor 166 may be omitted from the home appliance, but the server controller 200 may be provided with a server learning controller or processor 210.

That is, the input parameters for the learning process are transmitted from the home appliance to the server. Then, the server may perform learning based on the input parameters and then deliver the learning results to the home appliance. In this case, the home appliance does not require a separate learning processor, so the product cost of the home appliance may be lowered.

On the other hand, when the user want own home appliance or a home appliance customized to the user, it may be desirable for the home appliance to have a separate learning processor 166.

The home appliance includes the user interface 100. Inputting and outputting of the treatment information may be performed using the user interface 100. The specific configuration of the user interface is illustrated in FIG. 3 in one example.

Various input interface or selection interfaces 140, 150, 110, 120, and 122 in the user interface 100 may be configured for a user to physically select or input the input interface or selection interfaces. Alternatively, the various input interface or selection interfaces 140, 150, 110, 120, and 122 may be provided in any form of a button or a touch panel such that the input interface or selection interfaces 140, 150, 110, 120, and 122 may be input or selected via physical contact or pressurization. The input or selection interface may be embodied as a touch menu in the touch display.

However, the power input interface may be preferably provided in the form of physical buttons in an separate manner from the other input interfaces, for reasons of user experience or reduction of the standby power. In other words, the power input interface may be provided in the form of a mechanical power switch. It may be desirable that the starting input interface 150, which faces the power input interface 140, may be provided in the form of a physical button as well.

Hereinafter, a control method according to one embodiment of the present disclosure will be described in detail with reference to FIG. 5.

When the power is applied to the home appliance S10 and door closing is detected S20, a step S30 may be performed in which image information is generated and acquired by the camera.

The image information generated by the camera refers to a current image information of the object inserted for object treatment.

The user may insert the object after supplying the power first. When the object insertion is completed, the door is closed. Conversely, a user may feed power in a state in which the user has inserted the object and then has closed the door.

In any case, it is desirable that the power supplying S10, the door closing detection S20, and the image information acquisition S30 are sequentially performed. When a subsequent step is not performed within a predetermined time after the image information acquisition step S30, the power is automatically turned off, and a termination step S80 may be performed. In this connection, the acquired image information may not be used for learning.

When the image information is acquired S30, a step S40 may be performed in which the appliance obtains treatment information set by the user or sets treatment information by learning.

In the manual setting mode as described above, in this step S40, the treatment information that the user manually inputs is obtained by the main controller. This treatment information together with the currently acquired image information will be used for learning S50. However, as long as this manual setting mode continues, the learning may be performed but the learning result may not be reflected into the machine.

When the user approves the manually set treatment information using the voice or start input interface, the main controller 160 performs object treatment based on the treatment information. When the object treatment is completed, the main controller executes power off to terminate the object treatment S80.

The learning S50 may be performed in parallel with the object treatment during the object treatment.

In one example, as described above, in the laundry washing machine, the object treatment information may include the sub information as well as the course information.

A blanket or a cotton doll with a relatively large volume may be classified into the same kind of objects. The blanket courses may be used to treat the blanket or cotton stuff.

The machine may receive the various image information about the blanket for the learning and the blanket course may be set automatically via learning of the image information. When a course specialized for cotton-doll or the like is not provided, the forced learning may be executed such that various image information about the cotton doll may be input to the machine for learning and the blanket course may be set automatically via learning of the various image information.

However, when washing a plurality of cotton dolls, these cotton dolls do not entangle with each other, and thus, there is a high possibility of causing vibration and resonance during spinning. On the other hand, for the blanket, there is a low possibility of causing vibration and resonance because the blanket is closely attached to the drum.

Therefore, the spinning RPM as the sub information is relatively high in the general blanket course. When using the learning, the treatment for the cotton doll is performed in the blanket course, the above problem may occur during spinning. In one example, spinning may not be performed reliably with a predetermined spinning RPM due to vibration and resonance.

Accordingly, in one embodiment of the present disclosure, when a plurality of objects are mixed with each other, the machine may specify an object that plays a decisive role in the washing quality and may determine the main washing course according to the specified object. For example, when the blanket and the cotton-dolls as laundry are mixed with each other, the washing course may be determined based on the cotton doll with considering the above RPM problem during spinning. In another example, when blanket and delicate or vulnerable laundry are mixed with each other, the washing course may be determined based on the blanket. In this case, the delicate or vulnerable object may be damaged. For this reasons, when various kinds of the laundry are mixed with each other, the washing course may be set based on a kind of the laundry susceptible to the damage among a plurality of laundry.

Further, in one embodiment of the present disclosure, to distinguish between a plurality of objects or laundry, or to identify a single laundry more accurately based on various view angles when the single laundry is present, the inner tube 6 or the drum as the object containing portion may be moved and rotated to capture the images at various angles to execute the object identification more precisely using the captured images at various angles.

In one example, in the above case, the initial treatment information may need to be corrected via learning based on the image acquired by rotation of the object.

Therefore, it is preferable that a step S70 is performed to determine whether correction of the treatment information based on learning is necessary either during the object treatment or before completion of the object treatment.

Such correction may be performed to correct and modify the primary information, that is, the course information itself, or to correct and modify various sub information.

Upon determination that the correction is required, correction information (in one example, spinning RPM lower than the predetermined spinning RMP among the treatment information currently set by the learning) may be reflected in the learning process S50.

Whether the correction is executed and the correction information is reflected may be informed to the user using the user interface before or during the object treatment.

Therefore, the termination S80 of the object treatment is preferably performed only after the object treatment process, the learning process, and the user notification process are all completed.

In the learning-based setting mode as described above, in the step S40, the treatment information is automatically set using the learning result and the currently acquired image information.

When there is a learning result that matches the currently acquired image information, the corresponding treatment information is output. The output treatment information may be set automatically.

It is desirable for the user to be aware that the setting of the treatment information is based on the learning. The user interface may be used to allow the user to recognize that the setting of such treatment information is based on the learning. Alternatively, the LED display units turn on in a variable manner and only then the set LED display unit turns on. Alternatively, the display is used, or the voice output using the speaker is used such that the user is aware that the setting of the treatment information is based on the learning. Thus, the user may intuitively recognize that the treatment information is set based on the learning result.

The object treatment S60, correction or non-correction determination step S70, learning step S50, and the like may be performed in the same manner according to the set treatment information.

As described above, in the step S40, the manual setting mode and the learning-based setting mode may be performed differently according to the selection of the user or may be performed differently depending on the number of learning results.

In the manual setting mode, the learning may be continued but the learning result may not be reflected. Thereafter, when the user selects the learning-based setting mode, the learning-based setting mode may be used while reflecting the learning results.

When the learning-based setting mode is performed by default, the forced learning may be executed at the beginning of the use of the home appliance when the learning results are not sufficient. when the learning results are sufficient, the treatment information may be set automatically. When image information for each of the treatment information provided is obtained, the appliance may perform true learning via image augmentation. This will be described later.

In another example, in the learning-based setting mode, the user approval process/step or the forced learning or injected learning step may be performed in the same way as above.

The learning process in the present embodiment may refer to a process of increasing the number of combinations of image information as distinguished from each other and treatment information to be output corresponding to each image information.

When the home appliance is a laundry washing machine, the type and number of laundry that a particular user may wash using a laundry washing machine may vary in a certain range. The old objects or laundry may be discarded when a new object or clothes is purchased. Thus, a limit of the number and types of the objects or laundry may be at a predictable level.

Therefore, the number of combinations of the image information predictable by the home appliance of a specific user and the corresponding treatment information may increase gradually, but may increase only to a predictable level. In other words, the predictable level of the number of combinations may be dealt with by the appliance without augmenting the performance of the home appliance itself.

Conversely, when the combinations of the image information about all objects that may be washed and the treatment information corresponding thereto is pre-created into database, the database may not be extended via learning and thus the machine may not evolve. Further, there is a great difficulty in creating the database of the combinations. When the home appliance itself has the database embedded therein, this may cause overloading of its own processor. When the server has the database embedded therein, this may take an excessive amount of time to transfer the information.

Therefore, it would be desirable to be free of an initial data base but to extend database in a specific manner to the specific user via the learning process. In addition, it is desirable that the learning itself is performed in the home appliance or server, but the database of the learning results may be managed by the home appliance itself.

Hereinafter, a control method according to one embodiment of the present disclosure will be described in detail with reference to FIG. 6. In this embodiment, the learning-based setting mode and the manual setting mode may be clearly distinguished from each other.

Figure 5:
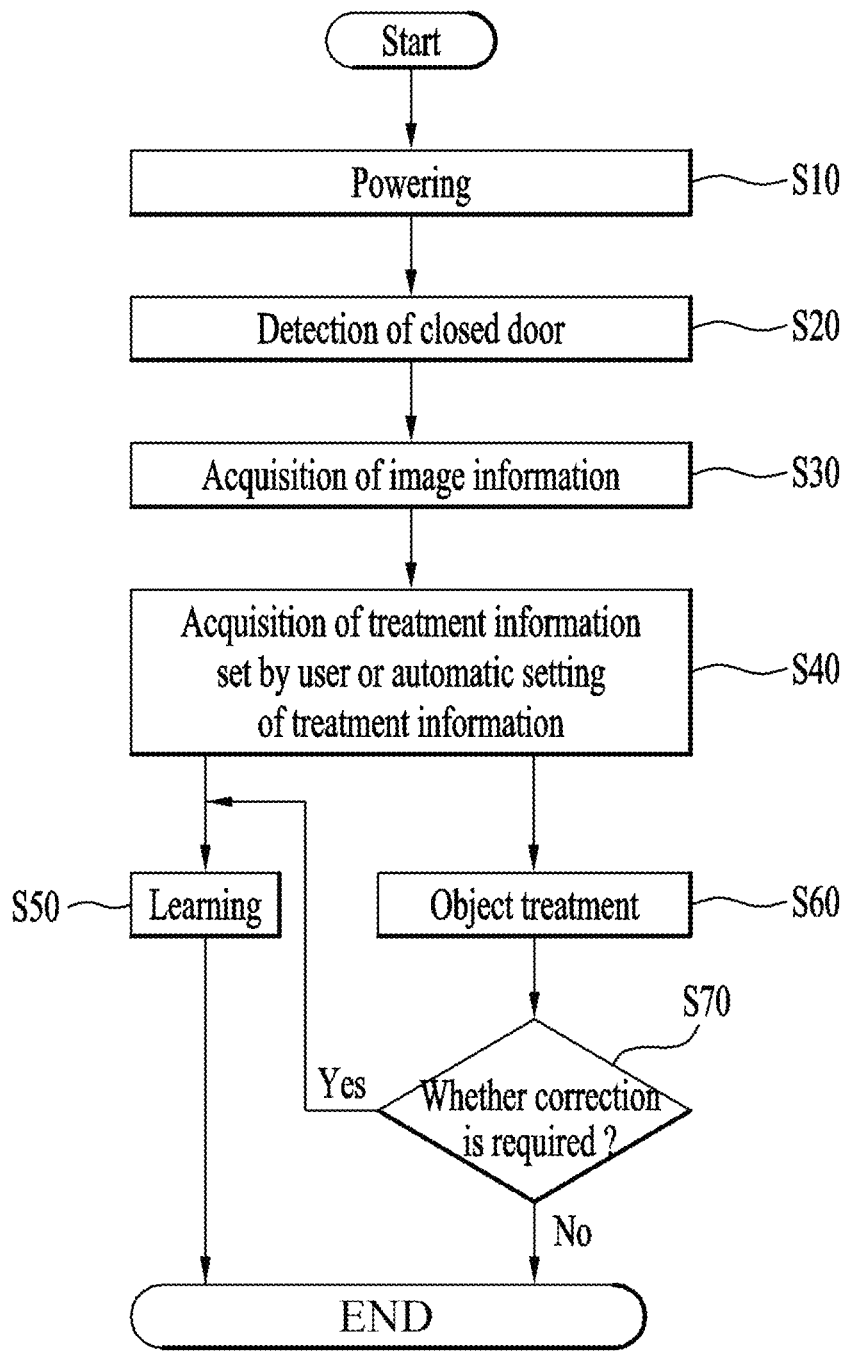
FIG. 5 is a flow chart illustrating a method of controlling a home appliance according to one embodiment of the present disclosure.

First, the power supplying S110, door closing detection S120, and image information acquisition S130 steps may be the same as the embodiment shown in FIG. 5.

After the image information acquisition step is performed, a step S140 is performed to determine whether to proceed with the learning-based setting mode or the manual setting mode. In another example, the door determination and/or image information acquisition steps may be performed after the determination step S140 is performed.

When a user chooses a learning-based setting mode via a learning-based course input or the like, the learning-based setting mode may be performed. The learning-based course input may be performed variously using the user interface. Further, the learning-based course may be set as the default course. In this case, the learning-based setting mode may be performed. When the previous mode of the home appliance is a learning-based setting mode, the learning-based setting mode may be set by a default. when the learning-based setting mode is not selected or is not set to the default mode, the manual setting mode may be performed.

When the learning-based setting mode is performed, a step S143 of determining the presence or absence of the learning result may be performed. That is, it may be determined whether the object treatment information corresponding to the currently acquired image information may be output. Upon determination that there is a learning result, the object treatment information corresponding to the currently acquired image information is automatically set S144. Then, the object treatment S160 is performed based on the set object treatment information.

In one example, a step S145 may be performed in which the user approves the set object treatment information. The user may identify the object treatment information as set using the user interface. Then, the object treatment information may be approved by the user. The user approval may be performed using the user interface, for example, selecting a startup input interface, using a voice. Alternatively, the object treatment information may be approved when the user does not input any additional input or response during the preset time duration.

In another example, the user may disallow the set object treatment information. Likewise, the set object treatment information may be disapproved using the voice or disapproved by the user entering new object treatment information S146. When the user enters the new object treatment information while disapproving the set object treatment information, the learning may be performed S147. In this case, the learning may be called the forced learning.

That is, while ignoring the currently acquired image information and the object treatment information set according to the previously learned result, the appliance may perform a new learning. The object treatment information entered by the user in the forced learning mode may be given priority over the object treatment information entered by the user in the general learning mode.

Thereafter, the object treatment is performed S160 based on the object treatment information input by the user.

Upon determination that there is no learning result, the notification S148 may be performed. The appliance nay use a voice or display to tell the user that there are no learning results. Alternatively, the appliance may tell the user to input the object treatment information.

When the user inputs the object treatment information S149, the learning S150 may be performed. In this case, the learning may be called the general learning rather than the forced learning.

Thereafter, the object treatment is performed S160 based on the object treatment information input by the user.

Upon determination from the determination step S140 that the current mode is the manual setting mode, the user enters the object treatment information S141. In this connection, the learning is performed using the currently acquired image information and the object treatment information entered by the user. In this connection, the learning may be called the general learning rather than the forced learning. Then, the object treatment is performed based on the object treatment information input by the user.

Figure 6:
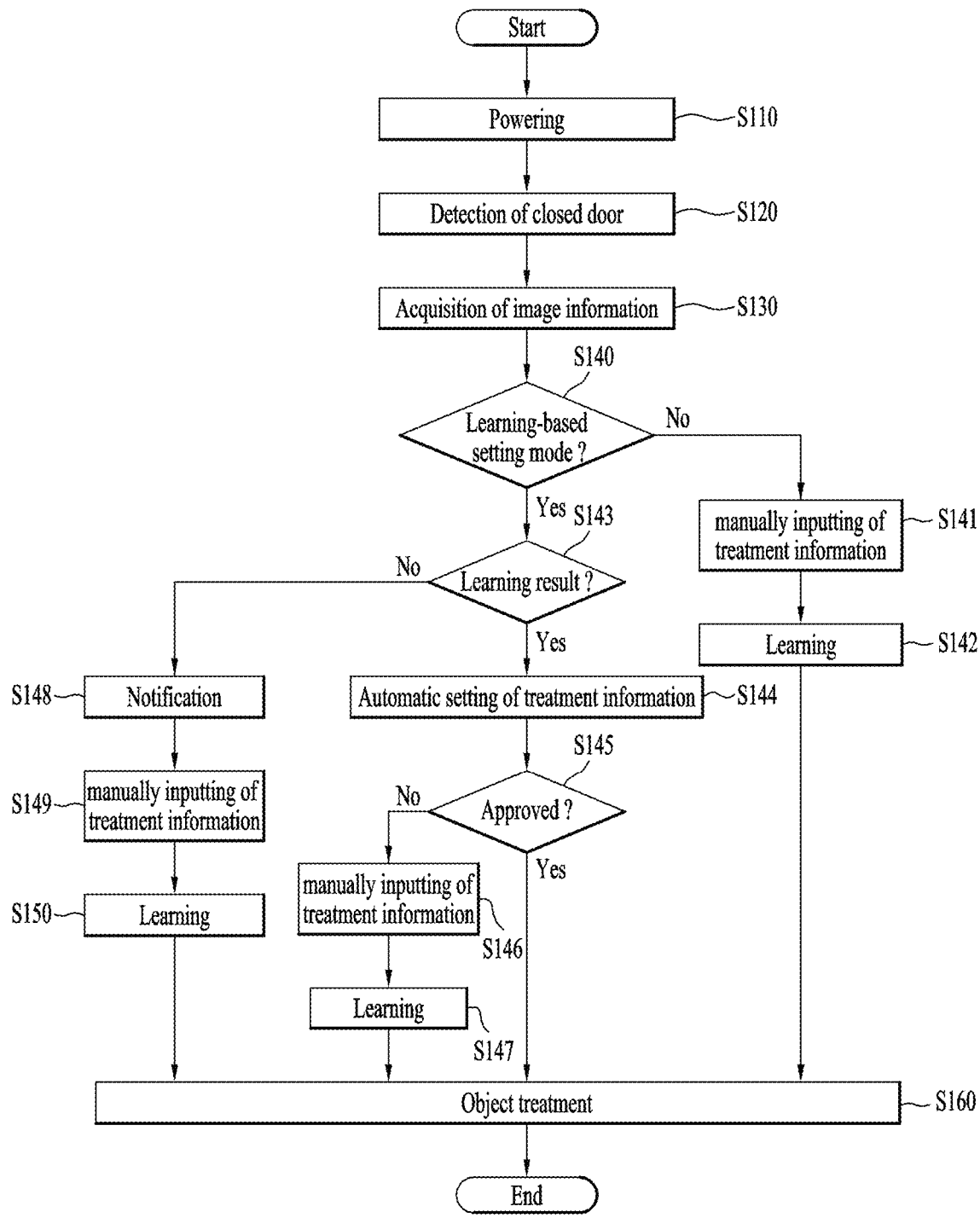
FIG. 6 is a flow chart illustrating a method of controlling a home appliance according to one embodiment of the present disclosure.
Figure 7:
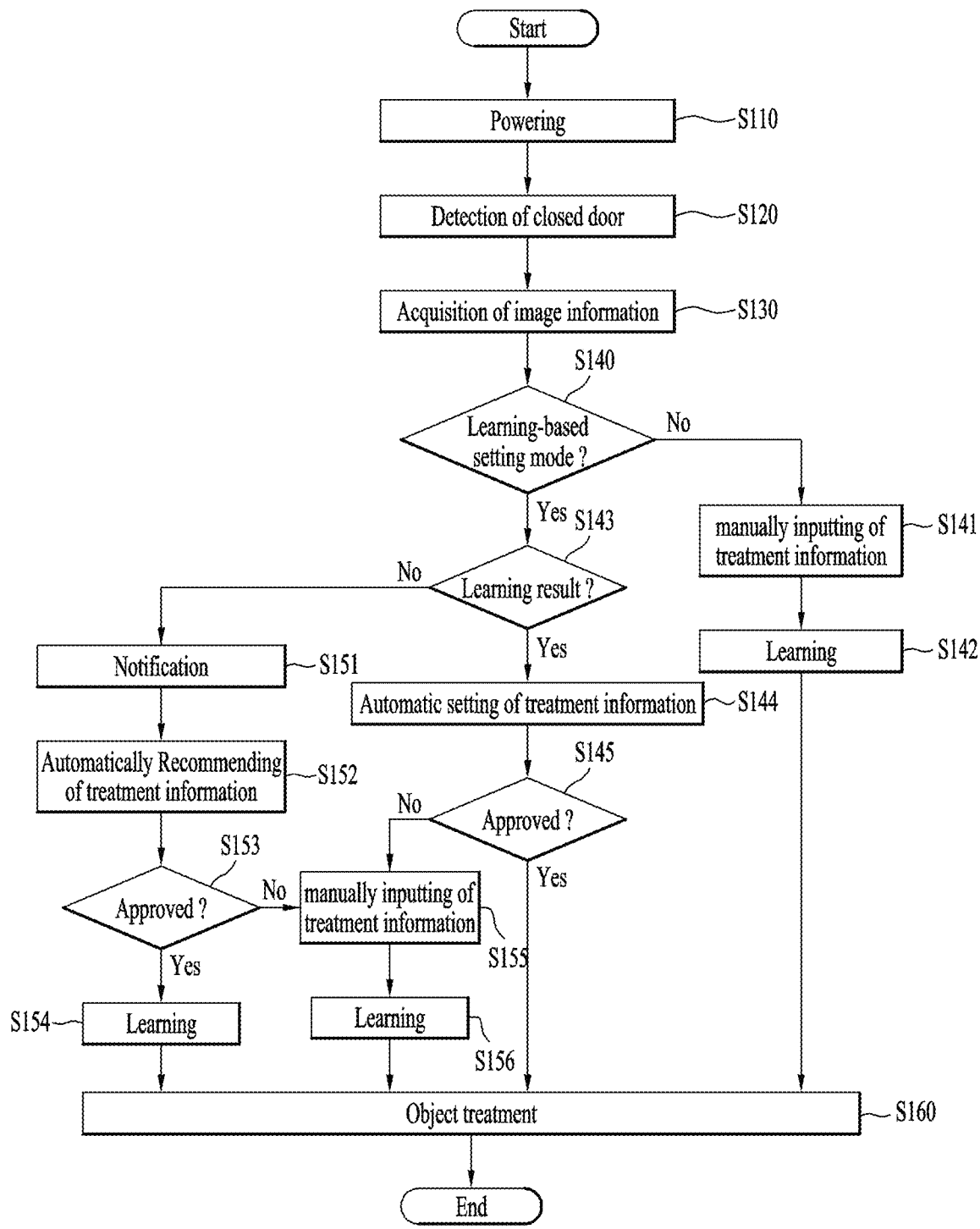
FIG. 7 is a flow chart illustrating a method of controlling a home appliance according to one embodiment of the present disclosure.

FIG. 7 may be a modified embodiment of the embodiment shown in FIG. 6.

When the user selects the learning-based setting mode, this may mean that the user does not enter the object treatment information manually. That is, this may be an expression of the user intention not to select specific object treatment information from a plurality of object treatment information or various combinations of object treatment information.

Therefore, in the present embodiment, unlike the case shown in FIG. 6, when there is no learning result, a step S152 for automatically recommending object treatment information may be performed. This may be done in various ways, such as recommending object treatment information, which is most similar to the current image information. In another example, the step S151 may be performed to notify the user of the recommendation or to inform that there is no learning result.

The user may approve or disapprove the recommended object treatment information. The approval and disapproval procedures or methods may be the same as described above.

When the user approves the recommended object treatment information, the learning be performed S154 and the object treatment S160 may be performed based on the approved object treatment information.

When the user does not approve the recommended object treatment information, the user may manually enter new object treatment information S155 and then the learning S156 may be performed. Similarly, the object treatment S160 may be performed based on the object treatment information as manually input by the user.

Figure 8:
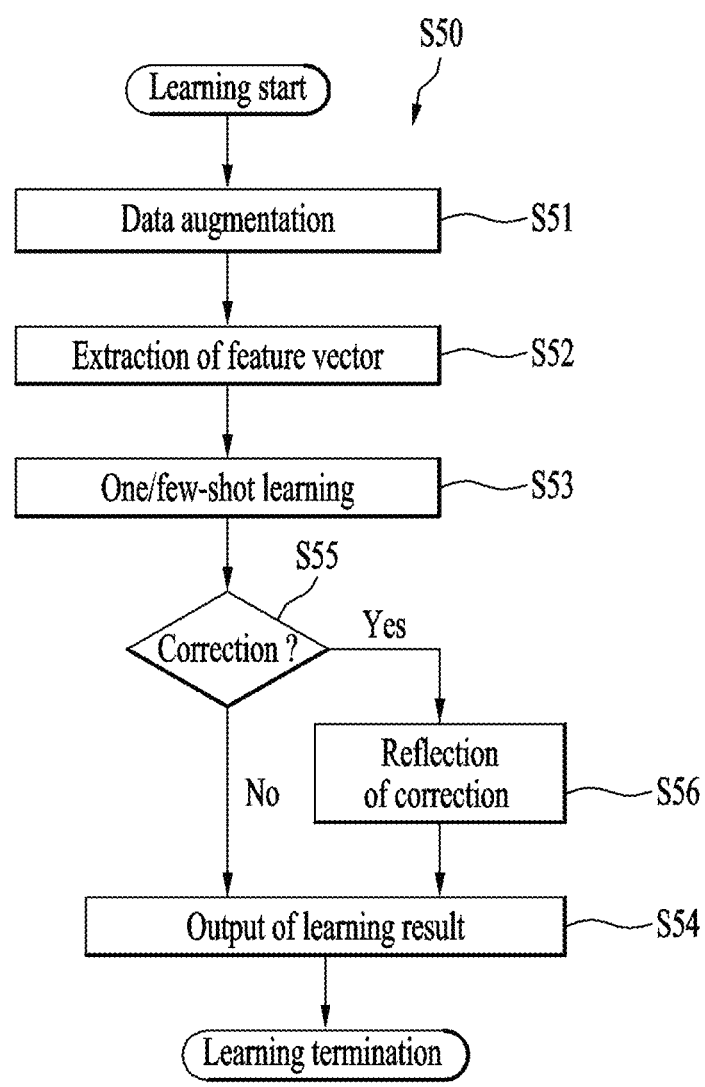
FIG. 8 is a flow chart showing a learning process shown in FIG. 5 to FIG. 7.

Hereinafter, with reference to FIG. 8, the learning that may be applied to one embodiment of the present disclosure is described in detail.

As described above, the learning in the present embodiments may mean a process of augmenting or increasing the number of matching combinations between previously acquired image information and acquired treatment information.

The following description may be used about performing the learning using image information.

Learning in this embodiment may be referred to as a process of performing learning by performing an image augmentation or data augmentation step S51 instead of the forced learning. Data augmentation may be performed by rotating, blurring, and brightening the acquired images. In addition, as described above, the data augmentation may refer to a process of securing images at various angles by rotating the laundry containing portion.

After augmenting the data, a feature vector may be extracted S52 using a CNN (Convolution Neural Network).

After the feature vector is extracted, one-shot/few-shot learning may be performed using a learning processor built in the home appliance or a server.

Standard deep learning systems require thousands or millions of examples to learn a concept, and cannot integrate new concepts easily. By contrast, humans have an incredible ability to do one-shot or few-shot learning. For instance, from just hearing a word used in a sentence, humans can infer a great deal about it, by leveraging what the syntax and semantics of the surrounding words tells us. Here, we draw inspiration from this to highlight a simple technique by which deep recurrent networks can similarly exploit their prior knowledge to learn a useful representation for a new image from little data.

Then, the one-shot/few-shot learning results may be output S54. That is, the treatment information corresponding to the learning result is outputted and set.

In another example, as described above, the output treatment information may not be used in a non-modified manner and may not be reflected but the learning result may be modified using the forced learning.

In one example, in the present embodiment, a step S55 may be further performed between the learning execution S53 via one-shot/few-shot learning and the learning result outputting S5, thereby to determine whether correction of the treatment information is to be performed using various images acquired in the washing process as described above. When correction of the treatment information may be likely to be required as the object treatment is performed. The learning execution S53 and learning result outputting S54 may be performed during object treatment or before termination of object treatment. Thus, the step S55 for determining whether the correction is to performed may be smoothly executed.

Upon determination that the correction is not required, the learned result may be output in a non-modified manner.

Upon determination that the correction is required, the machine may output the learning result reflecting the correction information to the treatment information.

Figure 9:
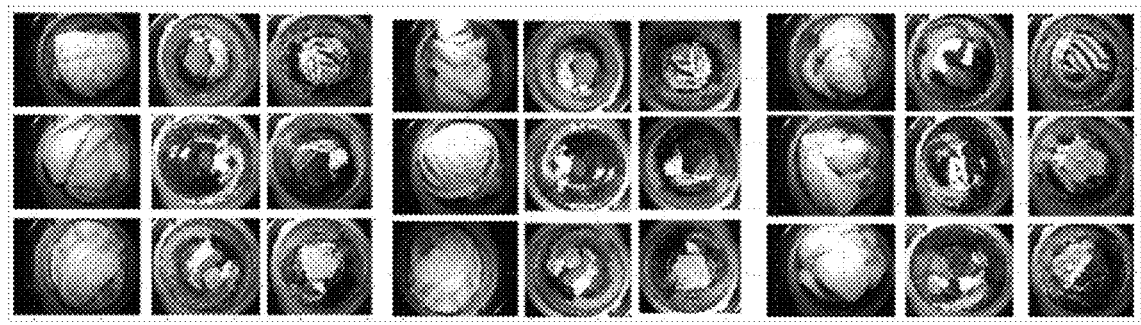
FIG. 9 shows one example of a database (DB) image.
Figure 10:
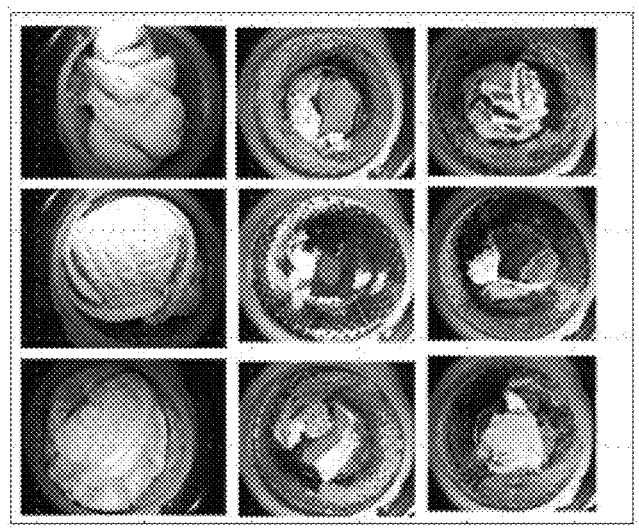
FIG. 10 shows one example of a query image.
Figure 11:
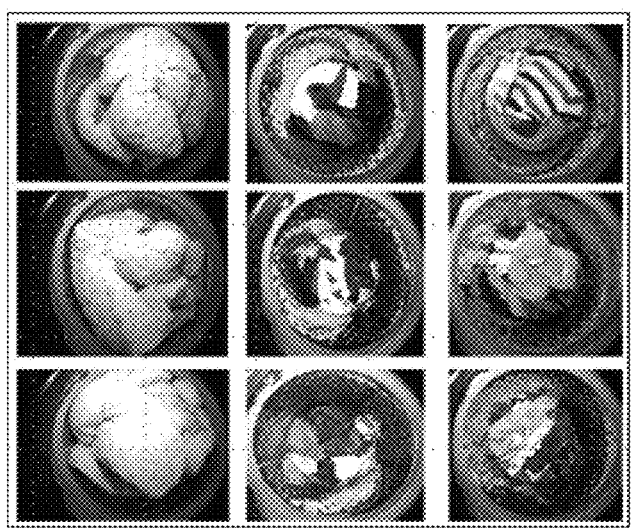
FIG. 11 shows one example of a support image.

Hereinafter, the learning process using the object image will be described in detail using FIGS. 9 to 12. FIG. 9 shows one example of images in database DB. FIG. 10 shows a query image and FIG. 11 shows one example of a support image. Such images may be generated by an RGB sensor, an RGB camera, or a gray camera.

In FIG. 9 to FIG. 11, a color image is converted into a black and white image for convenience.

As shown, the query image and the support image may be images of the database.

A predetermined number of the query images and the support images are randomly classified in the database DB image including the previously acquired images and the currently acquired images.

The query image refers to an image for augmentation and classification. Therefore, the query image may be the currently acquired image or an image before the classification and classification. That is, since the query image is an image before learning, the query image may be an image having no corresponding output value. The support image may be a necessary part used for obtaining information for clustering between main feature domains obtained from the same encoder. Such a support image may be obtained by acquiring images at various angles while rotating/moving the object as described above.

Various classification schemes may be used to obtain feature information from the query image. In this embodiment, a CNN scheme may be used as one example of the augmentation scheme.

Figure 12:
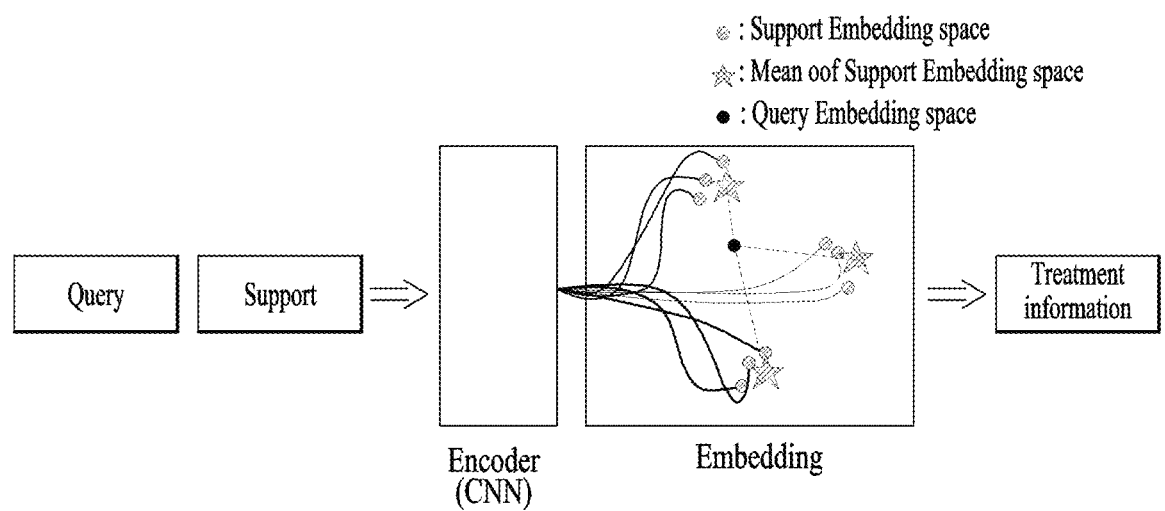
FIG. 12 shows a process of learning via classifying the query image.

As shown in FIG. 12, a feature vector is generated using an encoder that performs an augmentation of the query image. This feature vector is transformed into an embedding space, that is, a distance domain. Thus, same features of the treatment information will be clustered such that spacing therebetween is smaller. Heterogeneous features thereof are separated from each other.

Then, an average of the feature vectors extracted from the support image acquired as described in the above embodiment is obtained. A distance between the average of the support feature vector and the query feature vector is transformed into a stochastic value according to a known formula. The known formula may be a known augmentation formula in one shot learning or few shot learning scheme.

Therefore, the query image may be augmented. In other words, the query image may match with the previously learned image. Thus, treatment information may be output.

According to the above-described embodiments, the home appliance may be provided which may evolve via the learning and may allow the user to recognize the evolving, thereby improving the satisfaction of use of the user. In particular, the home appliance may be provided in which the treatment information may be set automatically to save the trouble of the user entering the treatment information manually.

The illustrations of the presented embodiments are provided so that a person of ordinary skill in the art of the present disclosure may use or implement the present disclosure. Various modifications to these embodiments will be readily apparent to those skilled in the art of the present disclosure. The general principles defined herein may be applied to other embodiments without departing from the scope of the present disclosure. Thus, the present disclosure is not to be construed as limited to the embodiments set forth herein but rather to be accorded the widest scope consistent with the principles and novel features set forth herein.

What is claimed is:

1. A home appliance comprising:
a cabinet;
an object containing portion that is disposed in the cabinet and configured to receive an object to be treated;
a door provided on the cabinet and configured to open and close the object containing portion;
a camera disposed on the cabinet or the door and configured to generate image information of the object in the object containing portion;
a user interface configured to receive, from a user, treatment information for the object;
at least one processor; and
at least one computer memory operably connectable to the at least one processor and storing instructions that, when executed by the at least one processor, perform operations comprising:
obtaining a machine-learning result from a machine-learning operation based on (i) first image information that was previously acquired the camera, and (ii) first treatment information that was previously acquired through the user interface;
performing augmentation and classification of second image information, which was acquired after the first image information through the camera, with respect to the machine-learning result such that the second image information matches the first image information that was previously acquired;
generating and setting second treatment information based on the augmentation and classification of the second image information; and
controlling the home appliance to perform a treatment of the object based on the second treatment information,
wherein the machine-learning operation is configured to generate an increasing number of combinations of (i) a plurality of mutually-distinguished image information and (ii) a plurality of treatment information corresponding to the plurality of mutually-distinguished image information.

2. The home appliance of claim 1, wherein the user interface comprises at least one of (i) a speaker for outputting voice, (ii) a microphone for receiving voice, (iii) a display, or (iv) a button or touch panel for receiving pressurization or physical contact from a user.

3. The home appliance of claim 1, further comprising a door sensor configured to detect whether the door is closed,
wherein the camera is configured to generate the image information based on (i) power being applied to the home appliance, and (ii) a closed state of the door being detected by the door sensor.

4. The home appliance of claim 1, wherein the first image information comprises an input parameter that is input to the machine-learning operation, and
wherein the second treatment information comprises an output parameter that is output from the machine-learning operation.

5. The home appliance of claim 1, wherein the machine-learning operation is configured to be performed using at least one machine-learning processor embedded in the home appliance or in a server that is communicative with the home appliance.

6. The home appliance of claim 1, wherein the machine-learning operation comprises determining presence or absence of a machine-learning result corresponding to the second image information.

7. The home appliance of claim 6, wherein based on a determination of the presence of the machine-learning result corresponding to the second image information, the second treatment information corresponding to the machine-learning result is output and set.

8. The home appliance of claim 7, wherein the operations further comprise:
after setting the second treatment information, determining that the second treatment information is approved or disapproved by the user through the user interface.

9. The home appliance of claim 8, wherein the operations further comprise:
based on the user disapproving the second treatment information, performing a forced machine-learning operation to match (i) the first treatment information that was set by the user with (ii) the second image information.

10. The home appliance of claim 6, wherein the operations further comprise:
based on a determination of the absence of the machine-learning result corresponding to the second image information, performing a forced machine-learning operation to match (i) the first treatment information that was set by the user with (ii) the second image information.

11. The home appliance of claim 1, wherein the user interface comprises a start input interface configured to allow the user to approve the second treatment information such that the home appliance starts the treatment of the object based on the second treatment information.

12. The home appliance of claim 1, wherein the first treatment information and the second treatment information comprise a plurality of course information corresponding to treatment courses performed by the home appliance.

13. The home appliance of claim 12, wherein the user interface comprises a course selection interface that is configured to allow the user to select one of the plurality of course information,
wherein the plurality of course information comprises a machine-learning-based course in which the second treatment information is automatically set based on the machine-learning result; or
wherein the user interface includes a machine-learning-based course selection interface to allow the user to select the machine-learning-based course, wherein the machine-learning-based course selection interface is different from the course selection interface.

14. The home appliance of claim 13, wherein based on the user having most recently selected the machine-learning-based course using the course selection interface or the machine-learning-based course selection interface, the machine-learning-based course is configured to be selected as a default.

15. The home appliance of claim 13, wherein the operations further comprise:
based on a course other than the machine-learning-based course among the plurality of course information being selected, performing machine-learning using the second image information for the selected course.

16. The home appliance of claim 12, wherein the first treatment information and the second treatment information comprises auxiliary information as part of the course information.

17. The home appliance of claim 16, wherein the auxiliary information indicates at least one of (i) a washing-water temperature, (ii) a washing-water level, (iii) a spinning RMP, (iv) a washing strength, (v) a washing time duration, (vi) a rinsing frequency, or (vii) steam presence or absence.

18. The home appliance of claim 16, wherein the auxiliary information indicates at least one of (i) a drying or refreshing time duration, (ii) a hot air temperature, (iii) a temperature inside the object containing portion, (iv) a dryness level, (v) a humidity, or (vi) steam presence or absence.

19. The home appliance of claim 16, wherein the machine-learning operation comprises a correction process that is configured to change the auxiliary information during or after the treatment of the object based on the second treatment information.

20. The home appliance of claim 16, wherein during the treatment of the object and based on the second treatment information: additional image information of the object contained in the object containing portion is generated.

21. The home appliance of claim 12, wherein the second treatment information is set automatically.

22. The home appliance of claim 12, wherein based on the machine-learning result corresponding to at least one course information among the plurality of course information, the second treatment information is set automatically.

23. The home appliance of claim 12, wherein based on the machine-learning result corresponding to each of the plurality of course information, the second treatment information is set automatically.

* * * * *